Sept. 24, 1963  LA ROY E. ROBINSON  3,104,576
COMBINATION SAW GUIDE AND COOLANT APPLICATOR
FOR BAND SAWING MACHINES
Filed Nov. 21, 1960  2 Sheets-Sheet 2
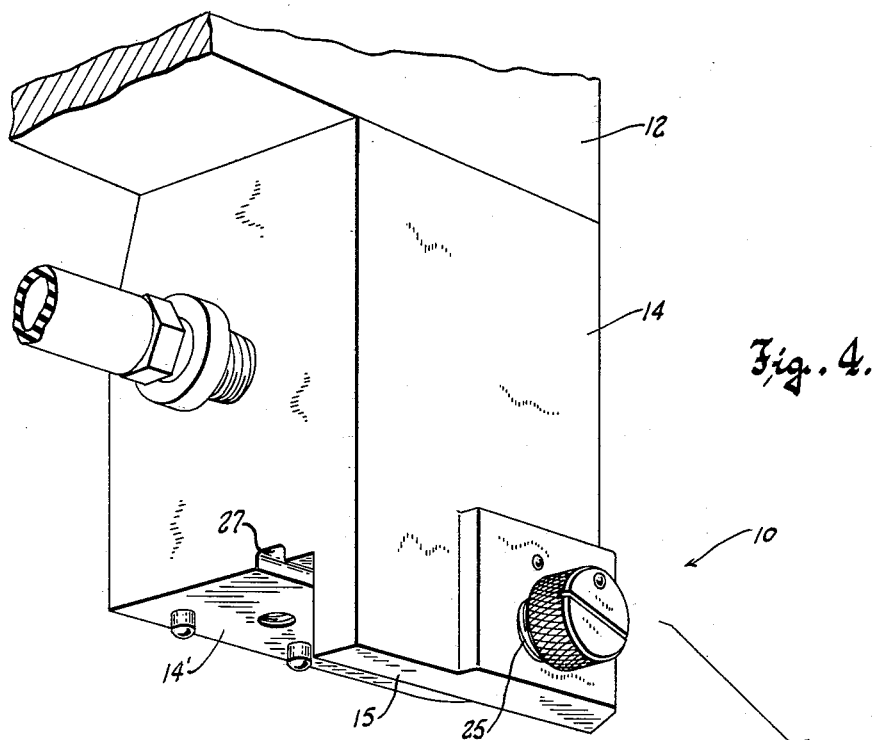
Fig. 4.
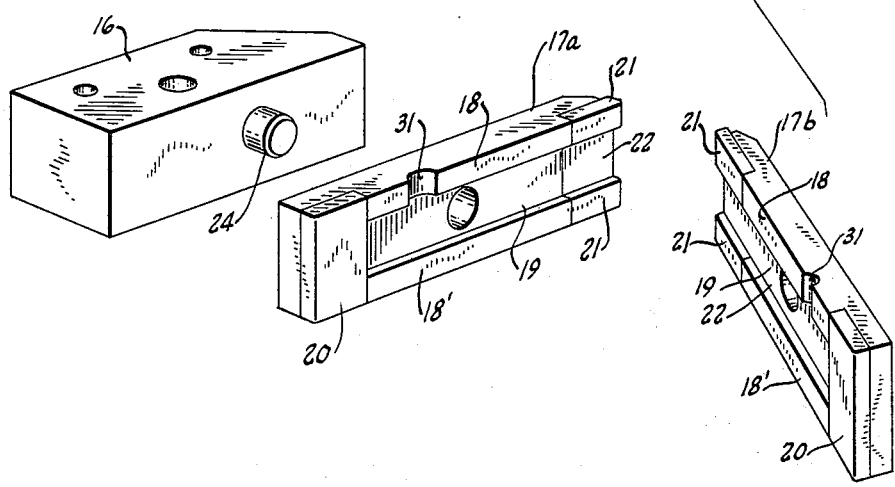
Inventor
LeRoy E. Robinson
By Ira Milton Jones
Attorney

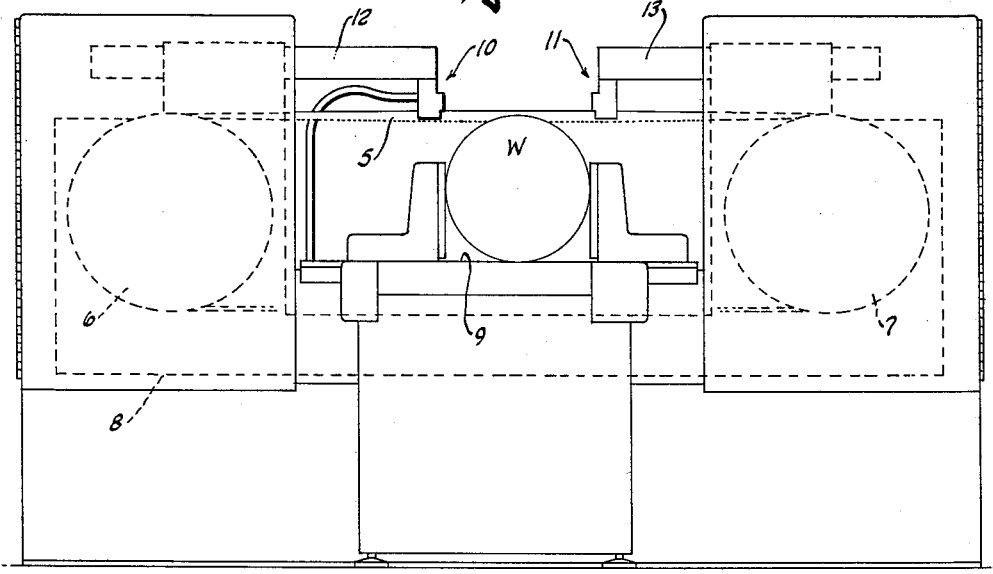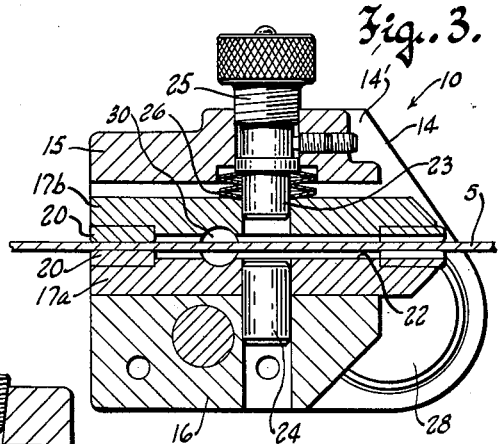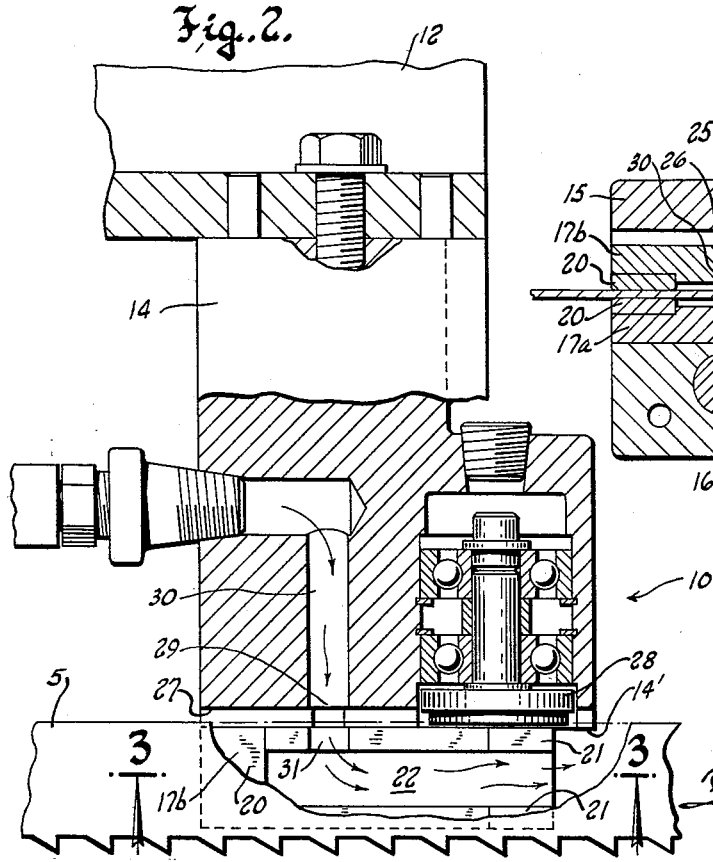

United States Patent Office 3,104,576
Patented Sept. 24, 1963

3,104,576
COMBINATION SAW GUIDE AND COOLANT APPLICATOR FOR BAND SAWING MACHINES
La Roy E. Robinson, Hopkins, Minn., assignor to Continental Machines, Inc., Savage, Minn., a corporation of Minnesota
Filed Nov. 21, 1960, Ser. No. 70,599
4 Claims. (Cl. 83—169)

This invention relates generally to sawing machines which employ an endless saw blade and has as its purpose to provide a guide for the saw blade which not only provides better guidance for the blade as it enters the work being cut, but in addition has means to fully and completely envelop the saw blade in liquid coolant as it passes through the guide and enters the work. The invention thus is a combination saw guide and coolant applicator.

Although the saw blade guide and coolant applicator of this invention may be used to good advantage in any conventional band saw wherein the saw blade travels vertically down through the work zone of the machine, it is primarily intended for use with cutoff saws which employ an endless saw blade, such as the cutoff saw of Patent No. 2,898,669.

In cutoff saws of this type, the pulleys which carry the endless band or blade lie in a plane which is more vertical than horizontal (the axes of the wheels approaching horizontal). Hence, the cutting stretch of the blade must be twisted to dispose the same in a vertical plane as it passes through the cutting zone. To effect this result, the saw guides must grip the sides of the band quite firmly. This requirement has been satisfactorily met by the saw guide which forms the subject matter of the copending application of Jack Hendrickson, Serial No. 816,812, now Patent No. 2,992,663. In the saw guide there disclosed, the saw blade is firmly held between a pair of cooperating guide shoes, yieldingly maintained in snug, sliding engagement with the band.

The present invention uses the same guide shoe assembly but modified in a novel manner to enable the guide shoes to perform the additional function of delivering liquid coolant to the saw blade as it passes between them.

More specifically, it is an object of this invention to provide a combination saw guide and coolant applicator especially adapted to guide the saw blade as it enters the work zone of the machine and equipped with means to not only deliver liquid coolant to the blade as it passes through the guide, but also to direct the coolant onto the blade in the direction of its travel and in a manner which assures complete envelopment of the blade in coolant as it enters the work.

With the above and other objects in view which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

The accompanying drawings illustrate one complete example of the physical embodiment of the invention constructed according to the best mode so far devised for the practical application of the principles thereof, and in which:

FIGURE 1 is a front view of a cutoff saw of the type forming the subject matter of Patent No. 2,898,669, equipped with the combination saw guide and coolant applicator of this invention;

FIGURE 2 is a front view on a much larger scale, and with parts broken away and in section, of the combination saw guide and coolant applicator of this invention;

FIGURE 3 is a bottom sectional view taken through FIGURE 2 on the plane of the line 3—3; and FIGURE 4 is an exploded perspective view of the component parts of the combination saw guide and coolant applicator.

Referring now particularly to the accompanying drawings, it will be seen that the invention has been illustrated in connection with a cutoff saw, wherein an endless saw band or blade 5 is trained about pulleys 6 and 7, carried by a movable saw head or frame 8. The head or frame 8 is mounted upon the base of the machine for translatory vertical motion to carry the cutting stretch of the saw band or blade, which in this machine is the top stretch, downward toward a work support 9 on the base of the machine. The cutting stretch of the band or blade travels from left to right as viewed in FIGURE 1.

Since the saw band or blade must have its cutting stretch disposed in a vertical plane as it passes through the work zone, and since the axes of the pulleys 6 and 7 are more nearly horizontal than vertical, it is necessary that the cutting stretch of the blade be twisted as it enters and leaves the work zone. It is, of course, also essential that the cutting stretch of the band or blade be held as firmly as possible against deviation from its proper vertically disposed position.

The twisting and holding of the band or blades is the function of the two saw guides indicated generally by the numerals 10 and 11, the guide 10 being located at the entrance of the blade into the work zone, and the guide 11 being located at the "downstream" side of the work zone.

The saw guides 10 and 11 are fixed to the outer ends of longitudinally aligned rails 12 and 13, respectively. These rails are firmly slidably mounted in the opposite end portions of the frame 8 for horizontal endwise movement parallel to the top stretch of the band or blade, to enable the saw guides to be disposed as close as practicable to the opposite sides of the work W being cut.

The downstream saw guide 11 may be exactly like that of the aforesaid Hendrickson Patent No. 2,992,663, but the saw guide 10 forms the subject matter of this invention, and is an improvement over its counterpart in that patent.

The improved saw guide 10 comprises a rigid supporting member or bracket 14, securely fixed to the underside of the rail 12 at the outer end thereof. At its lower end the bracket 14 has a flange 15 which projects down beyond the bottom or underside 14' of the bracket and, together with a block 16, solidly secured to the underside of the bracket, gives the lower portion of the supporting member or bracket a bifurcated shape, the flange 15 being one of its furcations and the block 16 the other. These furcations straddle the saw band or blade and have a pair of guide shoes 17a and 17b mounted therebetween.

The guide shoes are mirror images of one another and are substantially elongated rectangular metal blocks with spaced parallel upper and lower rails 18—18' projecting from their opposing inner faces 19. The rails 18—18' are straight and have flat sliding engagement with the opposite sides of the saw band or blade which travels lengthwise between the guide shoes. At their upstream ends, the guide shoes have hardened steel wear plates 20 inserted into their inner face portions, and at the downstream ends of the shoes there are narrower wear plates or inserts 21, which, in effect, form extensions of the rails 18—18'.

As shown, the rails 18—18' and the wear plates 20 and 21 have coplanar surfaces which are raised from the inner faces 19 of the shoes and have flat surface-to-surface engagement with the sides of the saw blade. Accordingly, the inner face aspect of each guide shoe is such as to provide or define an elongated groove or channel 22 which is open for its entire length and extends from the downstream end of the shoe to a point close to its upstream end where it is closed by the wear plate 20.

If desired, the rails 18—18' like the wear plate inserts 20 and 21, could be formed of a steel alloy harder than the metal of whch the rest of the shoe is formed. Hardened inserts, obviously, of course, are employed to reduce the wear on the guide shoes resulting from their tight sliding engagement with the opposite sides of the band or blade as it travels therebetween.

The guide shoes 17a—17b are removably mounted at the underside of the supporting member or bracket 14 in the space between its flanges or furcations 15 and 16 with their upper edges bearing against the underside 14' of the bracket. The shoes are held in position by pins 23 and 24 which project respectively from the inner faces of the furcations 15 and 16 and have a relatively close fit in appropriately located holes in the shoes. The pin 23 which mounts the shoe 17a preferably is a smooth reduced diameter end portion of a screw 25 threaded in the flange 15, and by which the tension of a stack of spring washers 26 interposed between a shoulder on the screw and the adjacent face of the shoe 17a, may be adjusted. The spring washers, of course, yieldingly urge the shoe 17a towards the other shoe 17b which may be considered stationary since it is at all times solidly supported by the block or furcation 16. In this way, the saw blade is constrained to travel along a path fixed by the location of the stationary shoe 17b.

The fixed location of the guide shoe 17b is such that the back edge of the saw blade will be symmetrically disposed with respect to a groove 27 in the underside 14' of the supporting member. This groove provides clearance between the back edge of the saw blade and the supporting member and enables all of the reaction to the sawing force to be carried by a backup roller 28 journalled in the supporting member, as more fully described in the Hendrickson patent.

The back edge of the saw blade also bisects the mouth 29 of a passage 30 formed in the supporting member for the delivery of liquid coolant to the guide shoes. Directly in line with the mouth 29, the upper rails 18—18' of the two shoes are interrupted to provide inlet ports or ducts 31 through which liquid coolant issuing from the mouth of the passage 30 enters the elongated grooves or channels 22.

Hence, the liquid coolant supplied under pressure to the passage 30 in any suitable manner, continually flows into the grooves or channels 22 and onto relatively large areas of the opposite sides of the band or blade, and out through the open downstream ends of the grooves or channels along with the band or blade as it leaves the guide shoes. The coolant is, therefore, very effectively and copiously applied to the band at exactly the right location—directly upstream from its entrance into the work zone, with little or no tendency to leave the advancing blade.

From the foregoing description taken in connection with the accompanying drawings, it will be readily apparent to those skilled in this art, that this invention provides a combination saw guide and coolant applicator, which performs both these functions in a more effective and efficient manner than was heretofore possible, and that the invention is particularly significant because of its improved application of coolant to the saw band or blade.

What is claimed as my invention is:

1. A combination saw guide and coolant applicator for the saw blade of a band-type sawing machine, wherein an endless blade travels linearly through the work zone of the machine, comprising a rigid supporting member; a pair of guide shoes carried by the supporting member, said guide shoes having opposing faces between which the saw blade travels, said faces being elongated in the direction of travel of the saw blade; means on each guide shoe defining an elongated groove which is open for its entire length to the adjacent side of the saw blade and extends from the downstream end of the shoe to a point close to the upstream end thereof, the downstream end of the groove being open and the upstream end being closed, so that liquid coolant supplied to said grooves bathes a substantial area of both sides of the saw blade and flows out from the open ends of the grooves to continue on with the blade; and means defining an inlet duct which opens to said grooves near their closed upstream ends and through which liquid coolant under pressure may be supplied to the grooves.

2. A combination saw guide and coolant applicator for the saw blade of a band-type sawing machine, wherein an endless blade travels linearly through the work zone of the machine, comprising: a rigid supporting member having a surface facing the back edge of the saw blade; a pair of guide shoes carried by said supporting member in juxtaposition to said surface, said guide shoes having opposing faces elongated in the direction of blade travel and between which the blade travels, said opposing faces being shaped to define elongated channels which are open for their entire length to the opposite sides of the saw blade and extend from the downstream ends of the shoes to a point close to the upstream ends thereof, the downstream ends of the channels being open and the upstream ends being closed, the shoes also having transverse grooves in their opposing faces leading from the upstream ends of their respective channels to the external portions of the shoes nearest said surface of the supporting member which faces the back edge of the saw blade, said transverse grooves of the two guide shoes being opposite one another and together forming an inlet duct which is bisected by the saw blade travelling between the shoes, and through which liquid coolant may be supplied to said channels to bathe a substantial area of both sides of the saw blade as it passes and then flow from the open downstream ends of the channels to envelop the saw blade as it leaves the guide shoes; and passage means in the supporting member having a mouth opening to said surface thereof in line with the inlet duct to provide for the delivery of liquid coolant to said inlet duct.

3. A guide shoe for endwise moving saw blades comprising: a block having a substantially rectangular blade engaging face; means on the block medially of the ends of its rectangular blade engaging face, by which the block may be mounted with the longitudinal dimension of its said face parallel to the path of movement of the saw blade, so that said face of the block has upstream and downstream ends; spaced rails extending lengthwise of said face and forming tracks along which the saw blade rides, the space between said rails being open at the downstream end and closed at the upstream end of its said blade engaging face and providing an elongated coolant applying and discharging channel; and means in said block nearer the upstream end of its said blade engaging face than the downstream end thereof defining an inlet passage leading to said channel from an external surface of the block other than its blade engaging face, through which liquid coolant may be fed to the channel.

4. In a band-type sawing machine having an endless saw blade which travels endwise in one direction through the work zone of the machine, a combination coolant applicator and saw guide for the saw blade comprising: a rigid supporting member; means mounting the supporting member directly upstream of the work zone of the machine with a surface of the supporting member contiguous to the back edge of the saw blade; a pair of guide shoes carried by the supporting member, one at each side of the saw blade, with a part of each shoe in juxtaposition to said surface of the supporting member, said guide shoes having opposing faces between which the saw blade slides; means yieldingly urging one of the guide shoes toward the other so that the shoes grip the sides of the saw blade travelling therebetween; elongated grooves in the opposing faces of the guide shoes, said grooves paralleling the direction of blade travel and being open to the adjacent sides of the saw blade, the downstream ends of the grooves being open so that liquid coolant fed to the grooves under pressure bathes a substantial area of the opposite sides of the saw blade as the blade passes and envelops the blade as the coolant discharges from the open downstream ends of the grooves to continue along with the blade; the supporting member having means defining an inlet passage for liquid coolant, the mouth of which opens to said surface of the supporting member in line with and extending to opposite sides of the saw blade; and means on the guide shoes forming inlet ducts leading from said mouth of the inlet passage to the grooves in the shoes.

References Cited in the file of this patent

UNITED STATES PATENTS

| | | |
|---|---|---|
| 195,626 | McDonough | Sept. 25, 1877 |
| 634,206 | Drake | Oct. 3, 1899 |
| 2,815,562 | Wilkie et al. | Dec. 10, 1957 |
| 2,992,663 | Hendrickson | July 18, 1961 |